US011681656B2

(12) United States Patent
Tuggle

(10) Patent No.: US 11,681,656 B2
(45) Date of Patent: *Jun. 20, 2023

(54) DATABASE SYSTEMS AND METHODS FOR AUTOMATED DATABASE MODIFICATIONS

(71) Applicant: salesforce.com, inc., San Francisco, CA (US)

(72) Inventor: Preston Tuggle, New York, NY (US)

(73) Assignee: salesforce.com, inc.

( * ) Notice: Subject to any disclaimer, the term of this patent is extended or adjusted under 35 U.S.C. 154(b) by 59 days.

This patent is subject to a terminal disclaimer.

(21) Appl. No.: 17/304,215

(22) Filed: Jun. 16, 2021

(65) Prior Publication Data

US 2021/0311911 A1 Oct. 7, 2021

Related U.S. Application Data

(63) Continuation of application No. 15/814,196, filed on Nov. 15, 2017, now Pat. No. 11,048,663.

(51) Int. Cl.
| | |
|---|---|
| *G06F 17/30* | (2006.01) |
| *G06F 16/17* | (2019.01) |
| *G06F 11/36* | (2006.01) |
| *G06F 16/25* | (2019.01) |
| *G06F 16/907* | (2019.01) |

(Continued)

(52) U.S. Cl.
CPC .............. *G06F 16/173* (2019.01); *G06F 8/33* (2013.01); *G06F 11/3664* (2013.01); *G06F 16/2453* (2019.01); *G06F 16/24573* (2019.01); *G06F 16/252* (2019.01); *G06F 16/907* (2019.01); *G06F 9/453* (2018.02)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

OTHER PUBLICATIONS

Vora, D. V., U.S. Appl. No. 15/629,143 entitled "Database Systems and Methods for Conversational Database Interaction," filed Jun. 21, 2017.

*Primary Examiner* — Hung D Le
(74) *Attorney, Agent, or Firm* — LKGlobal | Lorenz & Kopf, LLP

(57) ABSTRACT

Database systems and related customization methods are provided. One exemplary method of modifying a database to support a new functionality involves receiving user input indicative of the new functionality from a client device coupled to a network, identifying existing customizations associated with a user of the client device in the database, determining a plurality of different solutions for implementing the new functionality based at least in part on the existing customizations associated with the user, providing a graphical user interface display at the client device including graphical indicia of the plurality of different solutions for implementing the new functionality, and in response to receiving indication of a selected solution of the plurality of different solutions from the client device, automatically instantiating a new customization corresponding to the selected solution in the database.

17 Claims, 5 Drawing Sheets

(51) Int. Cl.
*G06F 16/2453* (2019.01)
*G06F 16/2457* (2019.01)
*G06F 8/33* (2018.01)
*G06F 9/451* (2018.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,356,679 B1* | 4/2008 | Le ................. G06F 16/116 713/1 |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,772,831 B2* | 9/2017 | Lucovsky ............ G06F 9/5072 |
| 9,952,852 B2* | 4/2018 | Scheidel ................ G06F 8/65 |
| 10,719,305 B2* | 7/2020 | Sinha .................. G06F 16/176 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0133610 A1* | 7/2004 | Flam .................... G06F 16/214 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |

(56) References Cited

U.S. PATENT DOCUMENTS

| | | |
|---|---|---|
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0052867 A1* | 2/2014 | Lucovsky ............... G06F 21/62 709/226 |
| 2015/0033217 A1* | 1/2015 | Mellor ................. G06F 21/604 717/171 |
| 2016/0378436 A1* | 12/2016 | Jensen ..................... G06F 8/70 717/102 |

* cited by examiner

DATABASE SYSTEMS AND METHODS FOR AUTOMATED DATABASE MODIFICATIONS

CROSS-REFERENCE TO RELATED APPLICATION(S)

This application is a continuation of U.S. patent application Ser. No. 15/814,196, filed Nov. 15, 2017, the entire content of which is incorporated by reference herein.

TECHNICAL FIELD

Embodiments of the subject matter described herein relate generally to database systems, and more particularly, to methods and systems for customizing components in a database system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like).

In practice, different users, tenants and/or organizations often have different types of data and/or different relationships between data that they would like to maintain in the multi-tenant system, along with different types of operations they would like to be able to perform on their data to achieve different business objectives. Accordingly, some multi-tenant systems include an application platform that supports a customizable user experience, for example, to create custom applications, web pages, reports, tables, functions, and/or other objects or features. However, creating and deploying new customizations can be difficult and time-consuming, and may result in conflicts with pre-existing customizations or other aspects of the platform(s) of the multi-tenant system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
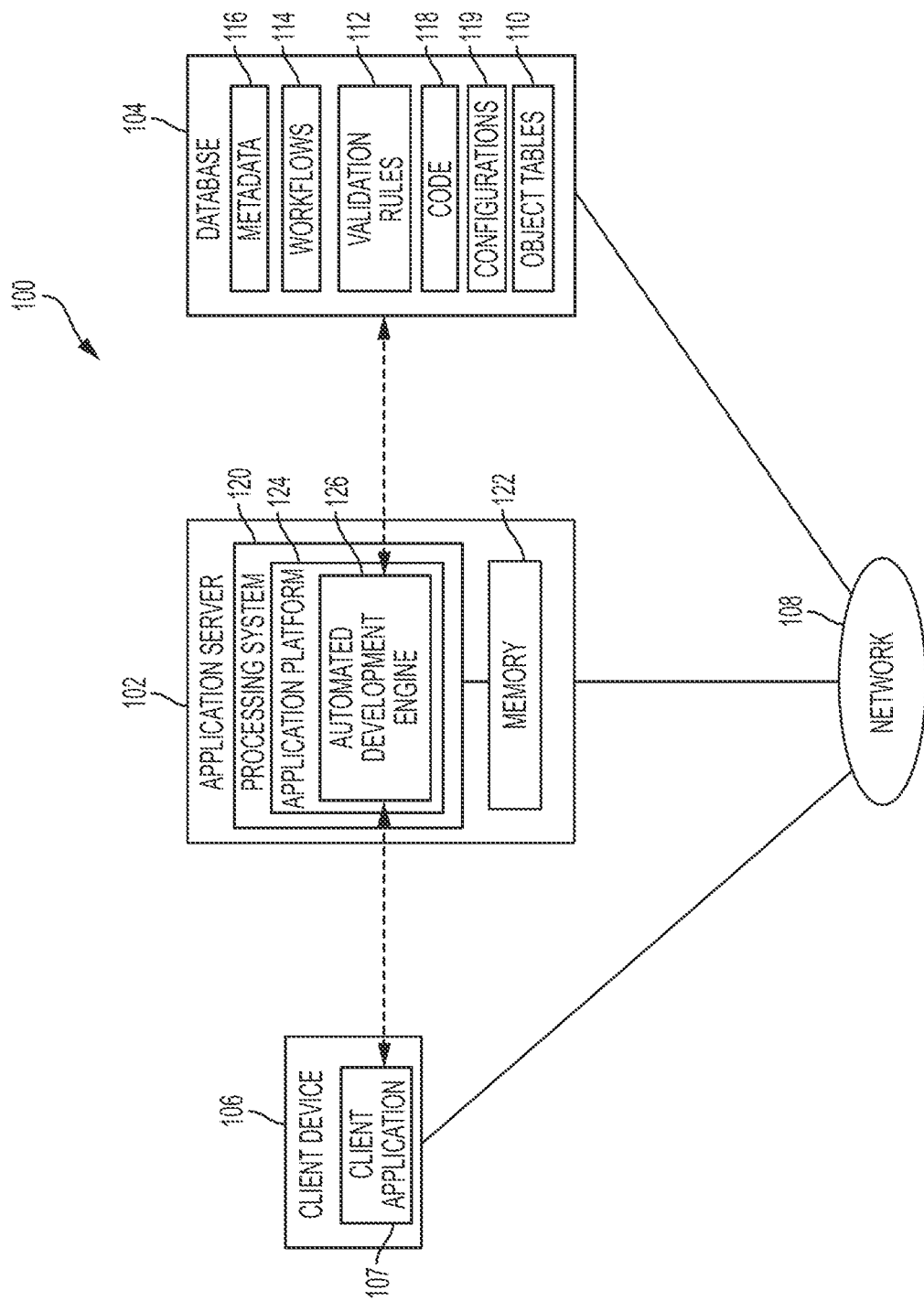
FIG. 1 is a block diagram of an exemplary database system.

Embodiments of the subject matter described herein generally relate to methods and systems for creating, instantiating, or otherwise customizing components of a virtual application in a database system in an automated manner that accounts for existing customizations and database configurations. In this regard, the automated customizations are determined using knowledge of the existing customizations so that they do not conflict with the existing customizations or otherwise cause errors upon implementation. Thus, automated customizations can be validated and migrated from a development environment to a production environment without generating errors requiring manual resolution. While the subject matter may be described herein in the context of an on-demand database system supporting multiple user groups or tenants, the subject matter is not necessarily limited to on-demand application or database systems, multi-tenant systems, or any other particular system architecture or arrangement described herein.

In exemplary embodiments, a user input is received by the database system and parsed or otherwise analyzed to identify the functionality or objective that the user would like supported within the database system. Thereafter, the custom metadata, objects, validation rules, workflows, code, point and click configurations, and the like associated with the user's instance of the virtual application are analyzed to determine a plurality of different potential solutions for implementing the desired functionality or objective in the database system without conflicting with the user's existing customizations. In this regard, the potential solutions account for the various validation rules, workflow rules, and the like that are already supported or implemented, such that implementing one of the potential solutions will not violate existing validation rules, workflow rules, or the like or otherwise result in conflicts or errors upon implementation. For example, if an existing custom workflow configured to apply to all of a particular tenant's objects references a particular field of those objects, a potential solution that involves creating a new custom object for that tenant also defines the structure of the new custom object to include the field referenced by the existing custom workflow to ensure errors are not generated when the existing custom workflow is subsequently triggered by modifications of the new custom object.

In one or more embodiments, machine learning or other artificial intelligence techniques may be utilized, either independently or in concert with additional logic rules, to identify various potential ways for achieving the desired functionality in the database system without violating the custom validation rules, workflow rules, or other constraints associated with the user's instance of the virtual application. Machine learning (e.g., neural networks, reinforcement learning, or the like) can be utilized to further limit the potential solutions to a relatively limited set of potential solutions based on one or more factors, such as, for example, similarity to existing customizations, previously-implemented solutions for similar functionality, optimization of a reward function, and/or the like.

In exemplary embodiments, a listing of a limited set of different potential solutions for achieving the desired functionality or objective is presented to the user for selection of one of the potential solutions. In response to selection of one of the solutions, the database system is automatically modified or updated to implement or otherwise support that solution, for example, by automatically creating the objects, fields, workflows, and/or other metadata associated with the selected solution in a development database and then automatically validating and migrating the modifications from the development database to a production database. In this regard, by virtue of the selected solution accounting for existing validation rules, workflows, and other applicable customizations, the modifications for achieving the desired functionality or objective are unlikely to result in errors or conflicts when deploying the modifications in the production database, thereby relieving the burden on the user on resolving such errors or conflicts that could otherwise result from failing to account for existing customizations. Additionally, the decision-making process is simplified for the user by deemphasizing the need for the user to manually consider how implementing a particular solution might undesirably impact existing customizations or functionality.

As one non-limiting example, an administrator user associated with a particular tenant, organization, or other user group may utilize natural language to interface with the database system to input or otherwise indicate a desire to track a new portion or new aspect of its business, suppliers, customers, etc. For example, the administrator user may indicate a desire to track suppliers and a few data points that are important to the tenant's business. An automated development engine associated with the database system analyzes the data points and suppliers to be tracked, and based on the tenant's existing customizations and standard database components, presents different solutions for tracking suppliers with respect to those data points. For example, the automated development engine may present three different solutions for tracking suppliers with respect to those data points: a first solution leveraging a standard database object (e.g., an Account object) and new data fields for the data points to be tracked, a second solution leveraging an existing custom object associated with the tenant that has yet to be deployed in production, and a third solution involving creating a new custom object with data fields for the data points to be tracked. Once a solution is selected, the automated development engine may automatically create and deploy the selected solution. For example, if the second solution is selected, the automated development engine may automatically create the new data fields associated with the existing custom object in a development database and then migrate that custom object with new data fields up to a production database, thereby enabling tracking suppliers with respect to those data points for users associated with the tenant using that custom object. If an existing custom workflow for the tenant references a particular data field of database objects, the automated development engine also automatically creates a corresponding data field associated with the custom object (if it did not already exist) in addition to the new data fields to ensure that the selected automated solution does not generate an error upon deployment to the production database when the existing custom workflow is applied to the custom object.

FIG. 1 depicts an exemplary embodiment of a database system 100 that including a server 102 communicatively coupled to a database 104. As described in greater detail below, the server 102 is capable of receiving input indicative of desired functionality to be supported within the database system 100 from a user of a client device 106 and automatically modifying components in the database 104 to achieve the desired functionality. In the illustrated embodiment, the server 102 is communicatively coupled to the database 104 and the client device 106 via a communications network 108. The communications network 108 may be realized as any sort or combination of wired and/or wireless computer network, a cellular network, a mobile broadband network, a radio network, the Internet, or the like. It should be noted that FIG. 1 is a simplified representation of a database system 100 for purposes of explanation and is not intended to be limiting. For example, in practice, multiple instances of client devices 106 communicating on the network 108 may be present, with any number of instances of applications being provided by the server 102 to various instances of client devices 106.

The server 102 generally represents a computing device, computing system or another combination of processing logic, circuitry, hardware, and/or other components configured to support the automated development processes, tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random access memory (RAM), read only memory (ROM), flash memory, magnetic or optical mass storage, or any other suitable non-transitory short or long term data storage or other computer-readable media, and/or any suitable combination thereof. In one or more embodiments, the programming instructions cause the processing system 120 to create, generate, or otherwise facilitate an application platform 124 that generates or otherwise provides instances of a virtual application at run-time (or "on-demand") based at least in part upon code and other data that is stored or otherwise maintained by the database 104. Accordingly, for purposes of explanation but without limitation, the server 102 may alternatively be referred to herein as an application server 102.

In exemplary embodiments, the programming instructions also cause the processing system 120 to create, generate, or otherwise facilitate an automated development engine 126 that supports the automated development processes and related tasks, operations, and/or functions described herein. Depending on the embodiment, the automated development engine 126 can be integrated with or otherwise incorporated as part of a virtual application, or be realized as a separate or standalone process, application programming interface (API), or the like that is capable of interacting with the client device 106 independent of the virtual application to perform actions in the database 104.

The client device 106 generally represents an electronic device coupled to the network 108 that may be utilized by a user to access the application platform 124 on the application server 102 to retrieve data from the database 104 via the network 108. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information provided by the application platform 124 along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that communicates with the application platform 124 on the server 102 using a networking protocol. In some embodiments, the client application 107 is realized as a web browser or similar local client application executed by the client device 106 that contacts the application server 102 and/or application platform 124 using a networking protocol, such as the hypertext transport protocol (HTTP) or the like, to access or otherwise initiate an instance of a virtual application presented on the client device 106.

In exemplary embodiments, the database 104 stores or otherwise maintains data for integration with or invocation by a virtual application in objects organized in object tables 110. In this regard, the database 104 includes a plurality of different object tables 110 configured to store or otherwise maintain alphanumeric values or other descriptive information that define a particular instance of a respective type of object associated with a respective object table 110. For example, the virtual application may support a number of different types of objects that may be incorporated into or otherwise depicted or manipulated by the virtual application, with each different type of object having a corresponding object table 110 that includes columns or fields corresponding to the different parameters or criteria that define a particular instance of that object.

In one or more exemplary embodiments described herein, the database 104 stores or otherwise maintains application objects (e.g., an application object type) where the application object table 110 includes columns or fields corresponding to the different parameters or criteria that define a particular application capable of being generated or otherwise provided by the application platform 124 on a client device 106. In this regard, the database 104 may also store or maintain graphical user interface (GUI) objects that may be associated with or referenced by a particular application object and include columns or fields that define the layout, sequencing, and other characteristics of GUI displays to be presented by the application platform 124 on a client device 106 in conjunction with that application. Additionally, the database 104 stores or otherwise maintains additional database objects for association and/or integration with the application, which may include custom objects and/or standard objects, as described in greater detail below.

In exemplary embodiments, the database 104 also includes or otherwise maintains one or more validation tables 112 that include one or more validation rules or criteria associated with respective types of database object types that may be applied to entries in the various database object tables 110. A validation rule provides validation criteria for one or more fields (or columns) of a particular database object type, such as, minimum and/or maximum values for a particular field, a range of allowable values for the particular field, a set of allowable values for a particular field, or the like. Additionally, the validation rule may provide a default value to be assigned to a field (or column) of a particular database object table 110 when the value for that field of a particular record or entry in that database object table 110 does not satisfy the validation criteria for that field. In some embodiments, the validation rules associated with a particular database object type may identify or otherwise indicate required fields for that particular object.

Additionally, the database 104 stores or otherwise maintains metadata 116, which may be utilized to perform data manipulation and/or formatting. For example, the metadata 116 may include or define describe any number of process flows, workflows, formulas, business logic, structure and other database components or constructs that may be associated with a particular application database object. In this regard, in some embodiments, the metadata 116 may associated with a particular type of application or other database component may identify or otherwise indicate other database objects may be required for supporting the particular process flows, formulas, business logic, or other aspects of the logical structure of that application. The illustrated database 104 also includes or otherwise maintains one or more workflow tables 116 that include one or more workflows rules or logical criteria associated with respective types of database object types that may be applied to entries in the various database object tables 110. In this regard, a workflow rule defines actions, triggers, or other logical criteria or operations that may be applied or otherwise performed in response to creation, changes, or updates to a record in an object table 110.

In one or more exemplary embodiments, the database 104 also stores or otherwise maintains code packages 118 that may include source code, classes, and/or other components associated with a code package that may be installed or integrated with one or more instances of a virtual application supported by the database system 100. In this regard, the code package 118 may include compiled source code, byte-code or some other executable sequence of programming instructions in an assembly language, machine code, binary, or lower level programming language that can be retrieved and executed at run-time without having to performing compilation. The illustrated embodiment of the database 104 also stores or otherwise maintains point-and-click configurations 119 which may define the standard objects, console layouts, tagging, user interfaces, feed tracking preferences, search options, applications, tabs, custom objects, report types, workflow rules, and/or potentially other settings that may be associated with a particular instance of the virtual application.

As described in greater detail below in the context of FIGS. 2-4, in exemplary embodiments, the automated development engine 126 obtains the customizations associated with a user of the client device 106 or a group of users (or tenant) associated with the user of the client device 106 from the database 104 and utilizes the customizations to determine a plurality of different potential solutions for implementing new functionality or achieving an objective without conflicting with the existing customizations. For example, for an administrator user associated with a particular tenant, the automated development engine 126 may utilize the tenant identifier to identify or obtain information pertaining to any existing custom objects, custom validation rules, custom workflow rules, custom metadata or schema, custom code packages, and/or custom point-and-click configurations associated with that tenant from the relevant tables 110, 112, 114, 116, 118, 119 in the database 104. Using knowledge of the tenant's existing customizations in addition to standard database components, the automated development engine 126 determines potential solutions for implementing new functionality within that tenant's instance of a virtual application supported by the database system 100 in a manner that does not conflict with or cause errors with respect to the tenant's existing customizations.

It should be noted that FIG. 1 is a simplified representation of the database system 100 and is not intended to be limiting. For example, in one or more exemplary embodiments, the database system 100 includes multiple different databases 104 having existing customizations that may differ across different instances of the database 104. In one embodiment, the database system 100 includes a development database that represents a replication of at least a subset of the customizations associated with a particular user or tenant from a production database (e.g., database 104) with additional customizations that have not been integrated or implemented at the production database. Additionally, the database system 100 may include a testing database that represents a replication of at least a subset of the customizations and object data associated with a particular user or tenant from a production database, with potentially additional customizations that have not been integrated or implemented at the production database. As one non-limiting example, the testing database is realized as a replication of the up-to-date or real-time data maintained in the production database with at least some customizations associated with the particular user or tenant being modified with respect to the customizations in the production database. In one or more exemplary embodiments described herein, the automated development engine 126 obtains the current customizations from each of the different databases 104 within the database system 100 to determine potential solutions that do not conflict with existing customizations implemented at the production database and also do not conflict with existing customizations obtained from the development database or testing database that have not yet been implemented at the production database. In this regard, implementing a potential solution at the development database and migrating the solution from the development database to the testing database and then on to the production database does not generate errors or conflicts with the existing customizations upon instantiation at the respective databases.

Figure 2:
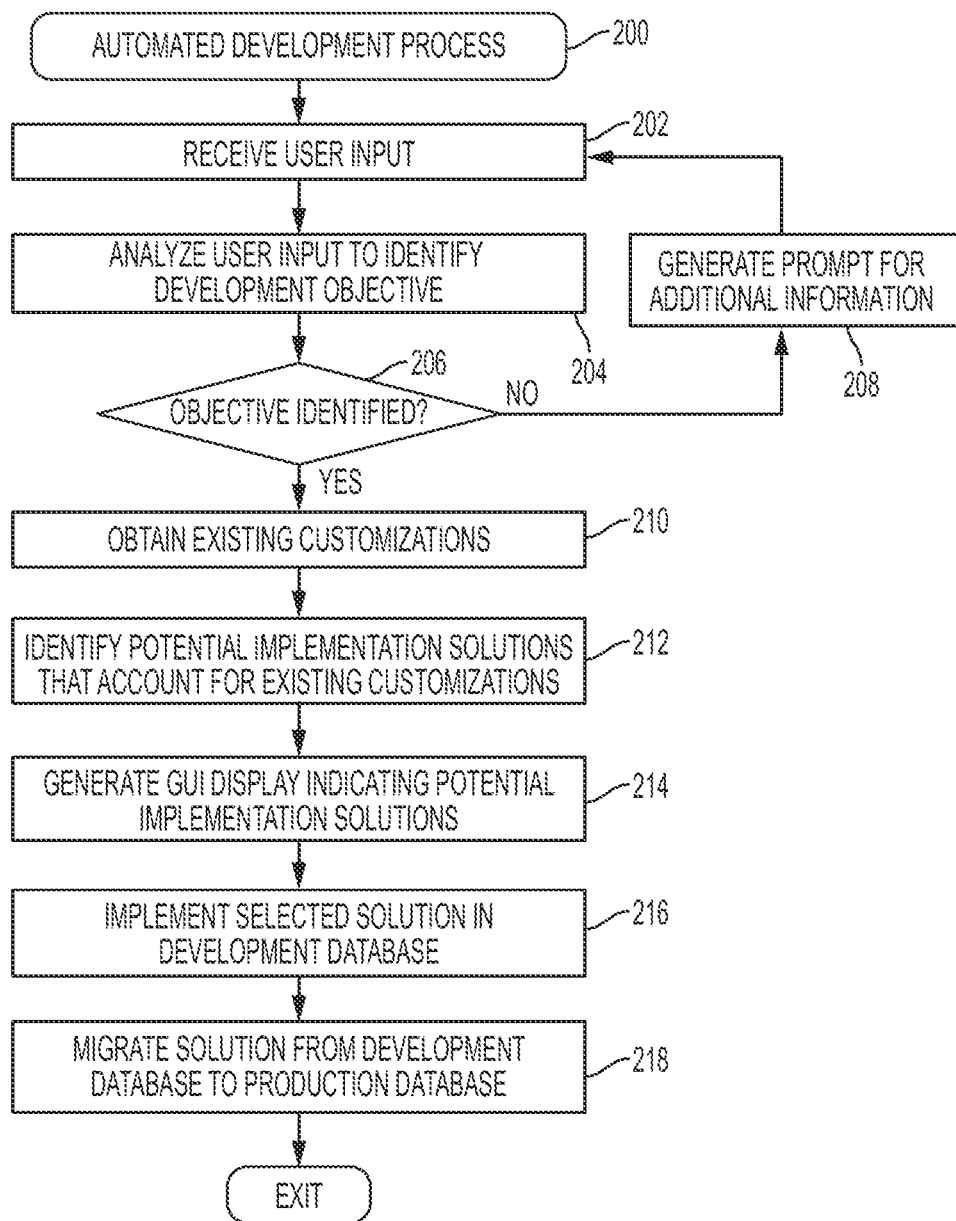
FIG. 2 is a flow diagram of an exemplary automated development process suitable for implementation in the database system of FIG. 1 in accordance with one or more embodiments.

FIG. 2 depicts an exemplary embodiment of an automated development process 200 suitable for implementation in a database system to upgrade and customize functionality without conflicting with existing customizations. For illustrative purposes, the following description may refer to elements mentioned above in connection with FIG. 1. In this regard, while portions of the automated development process 200 may be performed by different elements of the database system 100, for purposes of explanation, the subject matter is described herein in the context of the automated development process 200 being primarily performed by the application platform 124 and/or automated development engine 126 that are implemented or executed by the processing system 120 at the server 102. It should be appreciated that the automated development process 200 may include any number of additional or alternative tasks, the tasks need not be performed in the illustrated order and/or the tasks may be performed concurrently, and/or the automated development process 200 may be incorporated into a more comprehensive procedure or process having additional functionality not described in detail herein. Moreover, one or more of the tasks shown and described in the context of FIG. 2 could be omitted from a practical embodiment of the automated development process 200 as long as the intended overall functionality remains intact.

The automated development process 200 begins by receiving or otherwise obtaining an input from a user of a client device and parsing or otherwise analyzing the input to identify the desired objective or functionality that the user would like supported by the database system (tasks 202, 204). In one or more embodiments, the user input is conversational and realized as an unconstrained string or combination of words provided in a free-form or unstructured manner using natural language rather than a predefined syntax. In this regard, the automated development engine 126 may incorporate or reference a vocabulary of words, phrases, phonemes, or the like associated with a particular language that supports speech recognition or otherwise parsing and resolving text or other conversational input received by the automated development engine 126, or alternatively, the automated development engine 126 may invoke or otherwise leverage a speech recognition engine or similar artificial intelligence supported at the server 102 for resolving user input. Depending on the embodiment, the conversational input may be received unprompted, or alternatively, the user may manipulate the client device 106 to select or otherwise activate a GUI element that enables or initiates the automated development process 200. For example, in one or more embodiments, the automated development process 200 may be initiated in response to a user selecting a GUI element for a help feature, a digital assistant, or similar feature supported by the application platform 124. In response, the application platform 124 may generate or otherwise provide a GUI display or other GUI elements within the client application 107 on the client device 106 that prompt the user to indicate what he or she would like to accomplish. Thereafter, the user may input (e.g., via typing, swiping, touch, voice, or any other suitable method) a conversational string of words in a free-form or unconstrained manner, which is captured by the user input device of the client device 106 and provided over the network 108 to the application platform 124 and/or the automated development engine 126 via the client application 107 (or a virtual application provided therein).

The user input may be analyzed to identify any words (or variants) that match or otherwise correspond to fields, objects, actions and/or other functionality that may be supported by the application platform 124. For example, the desired functionality could be a new piece of data that the user would like to track, a relationship between different data object that the user would like to monitor, a new graphical user interface display or layout, or the like. In the absence of identifying the desired objective or functionality that the user would like supported, the automated development process prompts the user to provide additional input or recharacterize the desired functionality or objective until it is resolved by the automated development process (tasks 206, 208). In this regard, recognition vocabulary data could be utilized to generate or otherwise provide conversational output (e.g., text, audio, or the like) to the client device 106 for presentation to the user (e.g., in response to received conversational input) that prompts the user to input additional information or better define the functionality or objective the user would like to achieve.

After identifying the desired objective, the automated development process 200 continues by identifying or obtaining existing customizations associated with the user from one or more databases within the database system and identifying or otherwise determining a plurality of potential different solutions for achieving the new functionality corresponding to the desired objective in a manner that is influenced by the existing customizations (tasks 210, 212). In one embodiment, the automated development engine 126 utilizes machine learning or other artificial intelligence to output a listing of potential different solutions as a function of the existing customizations associated with the user and the desired functionality. For example, the existing customizations and new functionality to be supported may be input to a neural network model or other machine learning model or artificial intelligence model that probabilistically determines a plurality of development solutions for achieving the new functionality without conflicting with the existing customizations input to the model. In this regard, the model may be configured to output a limited number of potential solutions for presentation to the user (e.g., the three best potential solutions by probability). Such a model may be trained using previous customizations or modifications to achieve similar functionality, such that the potential solutions output by the model reflect existing customizations associated with the user or tenant or previous customizations for implementing similar functionality (e.g., by the particular user or tenant or other users or tenants supported by the database system 100). In some embodiments, reinforcement learning may be utilized to derive a reward function for modifying or upgrading the database, so that the potential simulations reflect existing customizations or previous modifications by optimizing the reward function. In another embodiment, an initial set of potential solutions for implementing the new functionality may be determined, and then filtered using the existing customizations (and potential conflicts therewith) to remove any potentially conflicting solutions arrive at a set of potential solutions that do not conflict with existing customizations. In exemplary embodiments, the automated development engine 126 also accounts for standard components in the database 104 (e.g., standard objects, standard validation and workflow rules, standard metadata, and the like) when determining potential solutions to ensure the potential solutions also do not conflict with standard components.

In exemplary embodiments, the automated development process 200 generates or otherwise provides a GUI display that lists a plurality of potential solutions for implementing the new functionality desired by the user (task 214). In this regard, the automated development engine 126 generates or otherwise provides a GUI display within the client application 107 on the client device 106 that includes a listing of potential solutions for achieving the user's objective, where each of the displayed potential solutions is associated with a selectable GUI element that may be selected by the user to indicate the potential solution that the user would like to implement.

In response to receiving indication of a potential solution that the user would like to implement, the automated development process 200 continues by automatically implementing or otherwise instantiating the selected solution in a development database (task 216). In this regard, the automated development engine 126 automatically modifies one or more of the object tables 110, validation tables 112, workflow tables 114, or metadata 116 maintained by the development database to implement the selected solution. For example, if the selected solution entails creating a new custom object, the automated development engine 126 may modify the object tables 110 and metadata 116 at the development database to support the new custom object. Additionally, if the selected solution entails a workflow influenced by a particular field of that new custom object, the automated development engine 126 may create that field in the object table 110 corresponding to the new custom object and then update the workflow tables 114 to implement the new workflow with respect to that new field of the new custom object. The automated development engine 126 may also modify validation rules 112 in the development database to apply to the new field or new custom object table 110. It should be noted that when machine learning or artificial intelligence models are utilized to determine potential different solutions, the selected solution may also be utilized to update the training data for the model or otherwise fed back to the model to further train the model. In this regard, the artificial intelligence model may adapt to reflect the potential solutions chosen by users.

In one or more exemplary embodiments, the automated development process 200 automatically migrates or deploys the selected solution from the development database up to a production database (task 218). For example, the automated development engine 126 may automatically perform validations at the development database and create a change set that captures the new or modified metadata, object data, workflows and the like implemented at the development database and dependent components, and then utilize the change set to deploy the selected solution for the new functionality from the development database up to a production database. For example, the automated development engine 126 may first utilize the change set to update a testing database to include the new or modified metadata, object data, workflows, and the like and perform validations at the testing database to ensure the new customizations do not generate errors or conflicts when applied to a replicated version of the production database before deploying the selected solution to the production database or another database. After validating the implementation of the selected solution at the testing database, the automated development engine 126 may automatically create a change set that captures the new or modified metadata, object data, workflows, and the like from the testing database and then utilize the change set to deploy the new or modified metadata, object data, workflows, and the like at the production database 104. In this regard, by virtue of the automated development engine 126 accounting for existing customizations at the various databases 104 within the database system 100, the automated development engine 126 is able to migrate and deploy the selected solution without errors or conflicts being generated with respect to existing metadata 116, existing workflows 114, existing validations 112, existing code packages 118, and/or existing point-and-click configurations 119.

Figure 3:
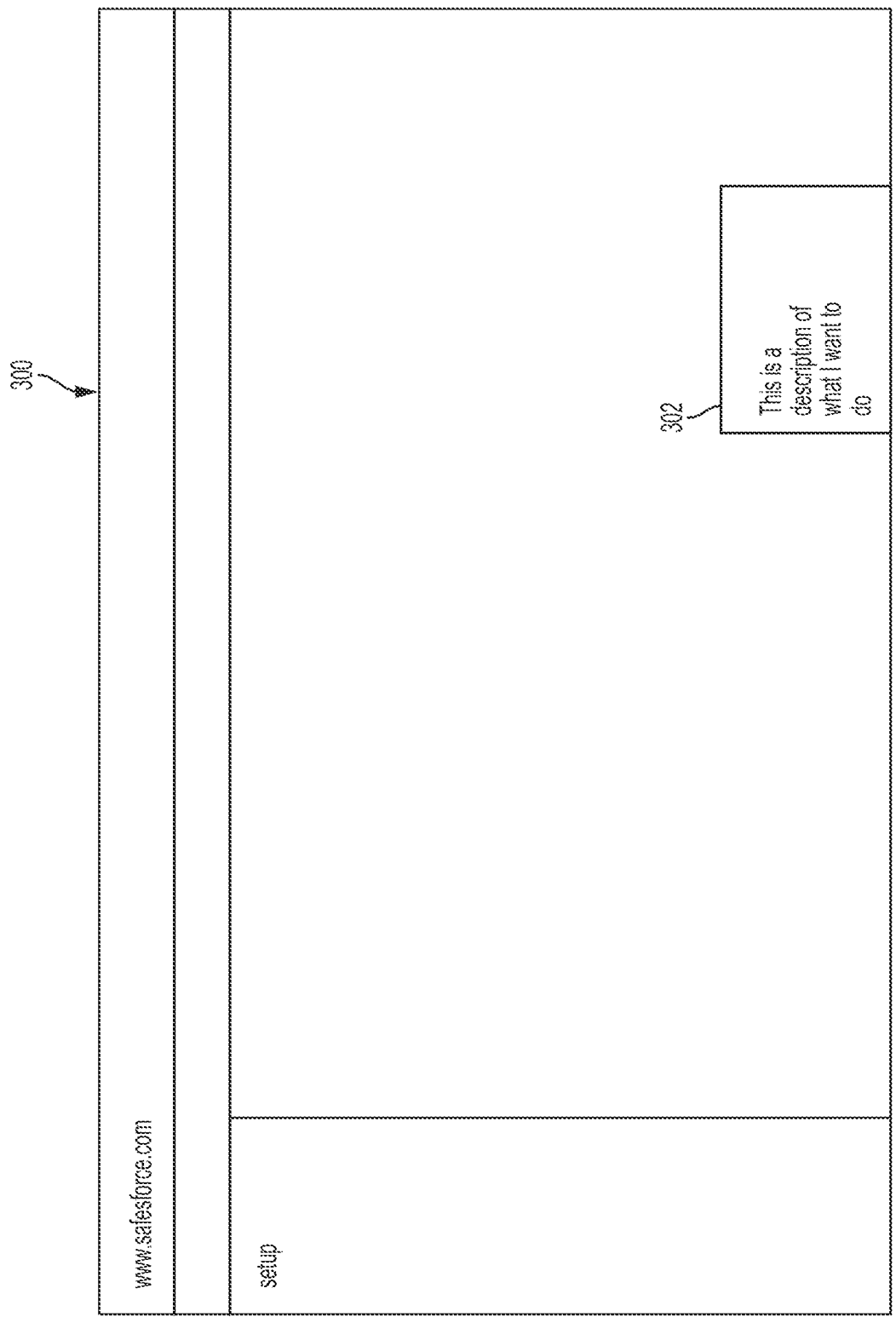
FIGS. 3-4 depict an exemplary graphical user interface (GUI) display sequence illustrating the automated development process of FIG. 2 in accordance with one or more exemplary embodiments.
Figure 4:
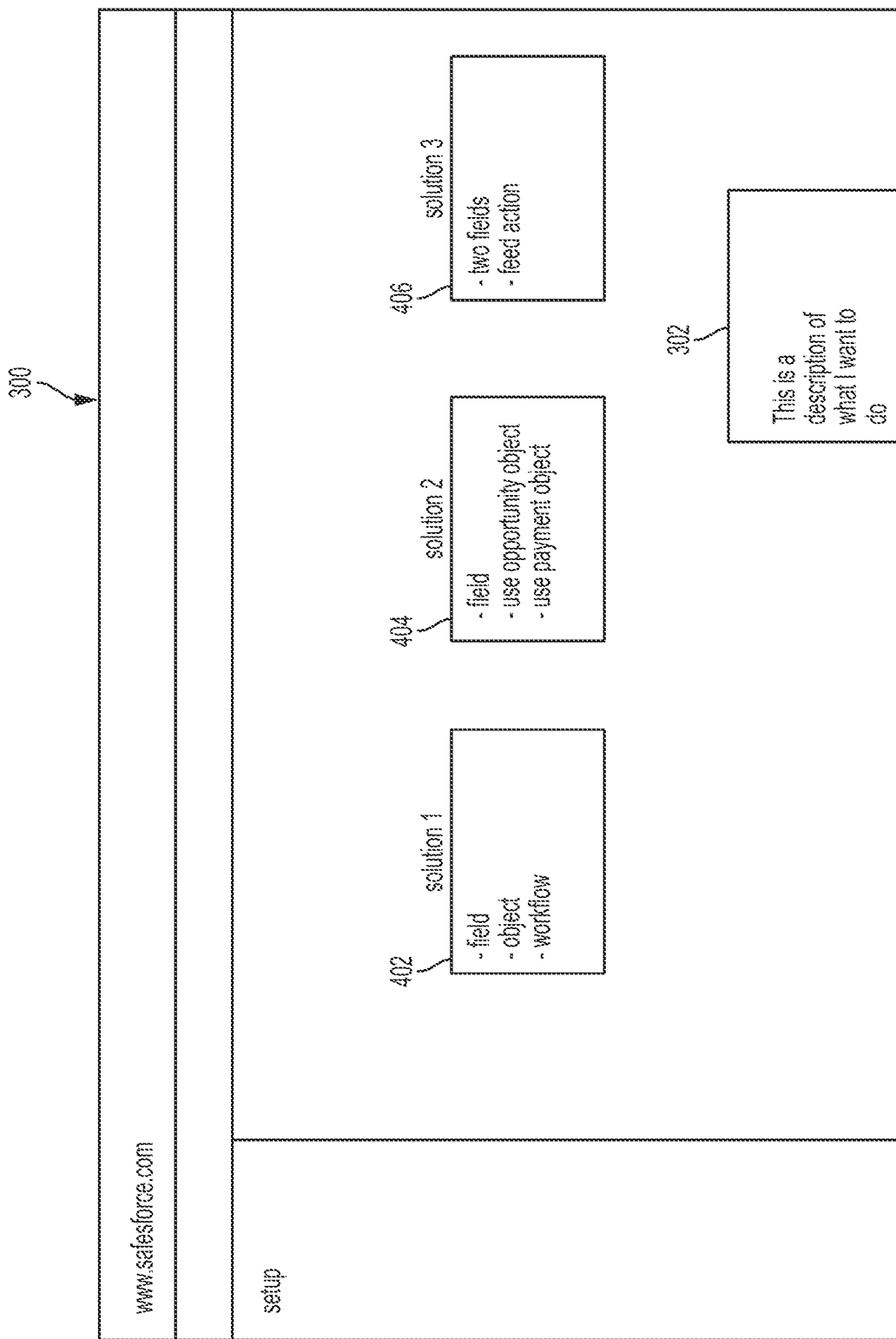

FIGS. 3-4 depict an exemplary sequence of GUI displays that may be presented within a client application 107 at a client device 106 in connection with the automated development process 200 of FIG. 2. For example, FIG. 3 depicts a setup GUI display 300 that may be presented by a virtual application within a browser application 107 on a client device 106 to an administrator user associated with a particular tenant or user group supported by the database system 100. In response to selection of a selectable GUI element within the setup GUI display 300 to add new functionality to instances of the virtual application associated with that tenant or user group, the automated development engine 126 generates or otherwise provides a text box, a window overlay, or similar GUI element 302 that may be utilized by the administrator user of the client device 106 to provide input indicative of a new functionality that the administrator would like to be supported. The automated development engine 126 analyzes the user input provided via the GUI element 302 to determine the new functionality to be added to the database system 100.

As described above, after identifying the new functionality to be supported, the automated development engine 126 identifies or obtains existing customizations associated with the user group or tenant whose instances of the virtual application are to be modified. In this regard, using a tenant identifier associated with the administrator user of the client device 106, the automated development engine 126 identifies or obtains custom metadata 116 associated with that particular tenant, information pertaining to custom objects 110 associated with that particular tenant, custom validation and/or workflow rules 112, 114 associated with that particular tenant, and any custom code packages 118 and/or point-and-click configurations 119 associated with that particular tenant. In exemplary embodiments, the tenant's existing customizations are identified or obtained from each different type of database supported within the database system 100, including any customizations implemented at development or testing databases in addition to the existing customizations implemented at the production database 104. Based on the tenant's existing customizations, the automated development engine 126 determines a plurality of different ways to implement or support the new functionality within the database system 100 without causing any conflicts or errors with respect to the tenant's existing customizations. In this regard, the potential solutions for implementing the new functionality may comply with existing custom validation and/or workflow rules 112, 114 associated with that particular tenant. The potential solutions may also account for existing custom code packages 118 and/or point-and-click configurations 119 to ensure they are able to be executed or performed without generating any errors or exceptions. The potential solutions for implementing the new functionality may also account for the tenant's existing custom objects 110 and/or tenant-specific metadata 116. As described above, machine learning, neural networks, and/or other artificial intelligence strategies may be utilized to probabilistically identify a limited set of potential solutions for implementing the new functionality that are optimized for the particular tenant given the tenant's existing customizations. In this regard, potential solutions may be ranked or ordered and then filtered using various criteria to obtain a limited set of potential solutions for display.

Turning now to FIG. 4, after identifying potential solutions for implementing the requested functionality via user interface element 302, the automated development engine 126 updates the setup GUI display 300 to include indicia 402, 404, 406 of the potential solutions for supporting the new functionality without conflicting with the tenant's existing customizations. For example, a selectable card, tile, icon, or the like may be presented for each displayed solution that includes information detailing or characterizing the new components or database modifications associated with implementing that solution. In the illustrated embodiment, the first card 402 for a highest ranked solution indicates that implementation for achieving the desired functionality involves a new custom field of a new custom object and a corresponding workflow that references that field of the new custom object. A second card 404 corresponding to the next highest ranked solution indicates that implementation for achieving the desired functionality involves a new custom field and leveraging existing objects supported by the database, which could be standard objects (e.g., an opportunity object) or existing custom objects (e.g., a payment object). A third card 406 corresponding to the next highest ranked solution indicates that implementation for achieving the desired functionality involves two new custom fields and an action or trigger for a web feed within the virtual application. The administrator user may review the implementation information presented within the cards 402, 404, 406 to determine which solution is believed to be most preferable or beneficial for his or her tenant given the administrator's understanding of the tenant's business processes, existing customizations, potential future customizations, and the like.

In exemplary embodiments, the cards 402, 404, 406 are selectable, and in response to selection of one of the cards 402, 404, 406, the automated development engine 126 automatically implements the selected solution in the development database (e.g., task 216). In exemplary embodiments, the automated development engine 126 also automatically migrates the solution from the development database to the production database; however, it should be noted that in other embodiments the automated development engine 126 leaves the solution implemented at a lower level (e.g., a development or testing database) for additional testing or development or manual deployment to the production database.

For example, in response to selection of the first card 402, the automated development engine 126 may automatically update the object tables 110 and metadata 116 in a development database to support a new custom object that includes a new custom field, and then automatically create a new workflow rule associated with the tenant and stored in the workflow tables 116 that references the new custom field of instances of the new custom object. The automated development engine 126 may then automatically validate or otherwise verify the modifications at the development database and then automatically create a change set that captures the new custom object type and new workflow rule. The automated development engine 126 may then use the change set to automatically deploy the new custom object type and new workflow rule at a testing database, automatically validate the modifications at the testing database, and then automatically deploy the new custom object type and new workflow rule to the production database 104 after validation at the testing database. In this regard, by virtue of the automated development engine 126 accounting for the tenant's existing customizations, the new custom object type and new workflow rule can be deployed without generating errors or conflicts during validation and migration through the different database levels. In exemplary embodiments, the new custom object type and new workflow rule are deployed automatically and without any manual interaction once the card 402 corresponding to that automated development solution is selected; however, in alternative embodiments, deployment and migration of an automated development solution across different databases may be subject to additional approval, verification, or other manual interaction by the user or an administrator.

Figure 5:
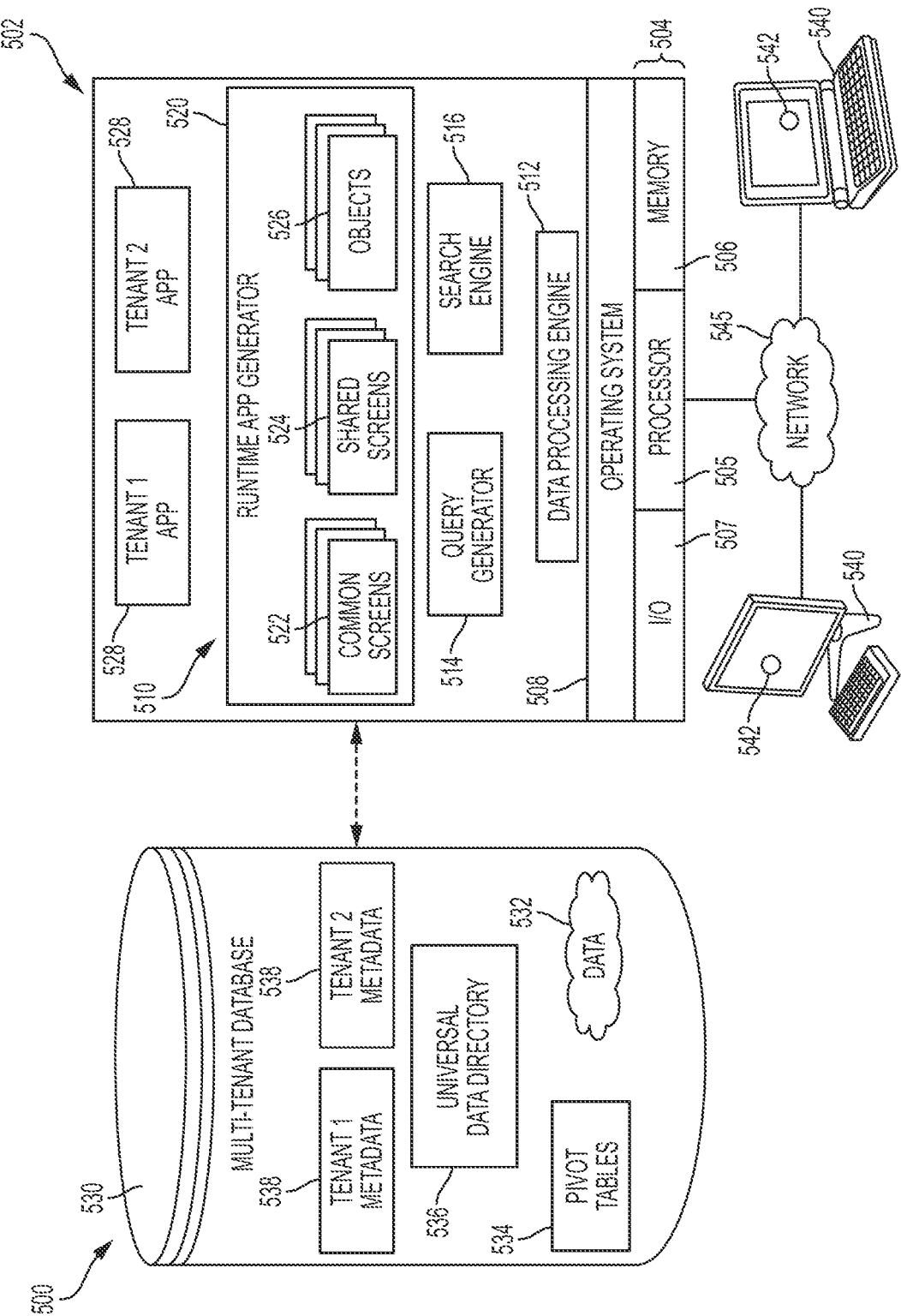
FIG. 5 is a block diagram of an exemplary multi-tenant system suitable for use with the computing system of FIG. 1 in accordance with one or more embodiments.

FIG. 5 depicts an exemplary embodiment of an on-demand multi-tenant database system 500 suitable for use with the automated development process 200 of FIG. 2 or the database system 100 of FIG. 1. The illustrated multi-tenant system 500 of FIG. 5 includes a server 502, such as server 102, that dynamically creates and supports virtual applications 528 based upon data 532 from a common database 530 (e.g., database 104) that is shared between multiple tenants, alternatively referred to herein as a multi-tenant database. Data and services generated by the virtual applications 528 are provided via a network 545 (e.g., network 108) to any number of client devices 540 (e.g., client device 106), as desired. Each virtual application 528 is suitably generated at run-time (or on-demand) using a common application platform 510 (e.g., application platform 124) that securely provides access to the data 532 in the database 530 for each of the various tenants subscribing to the multi-tenant system 500. In accordance with one non-limiting example, the multi-tenant system 500 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. To put it another way, each respective user within the multi-tenant system 500 is associated with, assigned to, or otherwise belongs to a particular tenant of the plurality of tenants supported by the multi-tenant system 500. Tenants may represent customers, customer departments, business or legal organizations, and/or any other entities that maintain data for particular sets of users within the multi-tenant system 500 (i.e., in the multi-tenant database 530). For example, the application server 502 may be associated with one or more tenants supported by the multi-tenant system 500. Although multiple tenants may share access to the server 502 and the database 530, the particular data and services provided from the server 502 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In various embodiments, the database 530 shares processing hardware 504 with the server 502. In other embodiments, the database 530 is implemented using separate physical and/or virtual database server hardware that communicates with the server 502 to perform the various functions described herein. In an exemplary embodiment, the database 530 includes a database management system or other equivalent software capable of determining an optimal query plan for retrieving and providing a particular subset of the data 532 to an instance of virtual application 528 in response to a query initiated or otherwise provided by a virtual application 528. The multi-tenant database 530 may alternatively be referred to herein as an on-demand database, in that the multi-tenant database 530 provides (or is available to provide) data at run-time to on-demand virtual applications 528 generated by the application platform 510.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

Still referring to FIG. 5, the server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528 and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or application platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user and/or tenant that initiated the request. In this manner, the query generator 514 suitably obtains requested subsets of data 532 accessible to a user and/or tenant from the database 530 as needed to populate the tables, reports or other features of the particular virtual application 528 for that user and/or tenant.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In exemplary embodiments, the application platform 510 is utilized to create and/or generate data-driven virtual applications 528 for the tenants that they support. Such virtual applications 528 may make use of interface features such as custom (or tenant-specific) screens 524, standard (or universal) screens 522 or the like. Any number of custom and/or standard objects 526 may also be available for integration into tenant-developed virtual applications 528. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 526 such as "account" objects, "opportunity" objects, "contact" objects, or the like. The data 532 associated with each virtual application 528 is provided to the database 530, as appropriate, and stored until it is requested or is otherwise needed, along with the metadata 538 that describes the particular features (e.g., reports, tables, functions, objects, fields, formulas, code, etc.) of that particular virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530. Typically, the user operates a conventional browser application or other client program 542 (e.g., client application 107) executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired.

Referring again to FIGS. 1-2 with reference to FIG. 5, in one or more exemplary embodiments, the server 502 and/or the application platform 510 supports the automated development process 200 to automatically develop and implement solutions for adding new functionality to instances of the virtual application 528 for a particular tenant supported within the on-demand multi-tenant system 500 by accounting for that tenant's existing custom objects 526, existing custom screens 524, or other existing custom metadata 538 along with any additional custom code, point-and-click configurations, custom validation and/or workflow rules, and/or other custom components supporting a customized data-driven virtual application 528 provided to users associated with that particular tenant within the system 500. In this regard, new custom objects 526, new custom screens 524, and/or new custom metadata 538 may be automatically created and implemented in the on-demand multi-tenant system 500 without interfering with the functionality of existing custom objects 526, existing custom screens 524, and/or existing custom metadata 538.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to database functions and operations, multi-tenancy, cloud computing, on-demand applications, artificial intelligence, speech recognition or analysis, software development, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A system comprising:
a data storage to maintain existing customizations; and
a processing system coupled to the data storage and a network to:
  receive user input indicative of a new functionality to be supported by a platform from a client device coupled to the network;
  probabilistically determine a plurality of modifications corresponding to different solutions for achieving the new functionality as a function of the existing customizations and the new functionality using a model configurable to probabilistically determine the different solutions;
  provide, at the client device, graphical representations of the plurality of modifications; and
  automatically implement one of the plurality of modifications corresponding to a selected solution of the different solutions in response to selection of the one of the plurality of modifications.

2. The system of claim 1, wherein the processing system is configurable to execute instructions to implement an automated development engine that is configurable to output the plurality of modifications as the function of the existing customizations and the new functionality.

3. The system of claim 2, wherein the automated development engine is configurable to determine the plurality of modifications by optimizing a reward function derived by reinforcement learning.

4. The system of claim 1, wherein the model comprises a neural network model, a machine learning model, or an artificial intelligence model.

5. The system of claim 1, wherein:
the user input comprises a conversational user input comprising an unconstrained string or combination of words provided in a free-form or unstructured manner using natural language; and
the processing system is configurable to analyze the conversational user input using speech recognition or artificial intelligence to identify the new functionality to be added.

6. The system of claim 1, wherein the platform comprises an application platform configurable to generate an instance of a virtual application at run-time based at least in part upon code and data maintained by the data storage.

7. The system of claim 6, wherein the code and data comprises the one of the plurality of modifications corresponding to the selected solution of the different solutions and the existing customizations.

8. The system of claim 1, the platform comprising an application platform supporting the existing customizations for a virtual application, wherein the user input is indicative of the new functionality to be added to the virtual application supported by the application platform.

9. The system of claim 8, wherein the existing customizations include at least one of a custom validation rule, a custom workflow rule, a custom code package and a custom point-and-click configuration.

10. The system of claim 1, wherein the data storage comprises an on-demand database and the platform comprises an application platform that provides access to data in the on-demand database.

11. The system of claim 1, wherein the graphical representations of the plurality of modifications comprise, for each modification of the plurality of modifications, a selectable card including information detailing one or more components involved in the respective modification of the plurality of modifications.

12. A system comprising:
a data storage to maintain existing customizations;
a development database; and
a processing system coupled to the development database, the data storage and a network to:
receive user input indicative of a new functionality to be supported by a platform from a client device coupled to the network;
determine a plurality of modifications corresponding to different solutions for achieving the new functionality based at least in part on the existing customizations;
provide, at the client device, graphical representations of the plurality of modifications; and
automatically implement one of the plurality of modifications corresponding to a selected solution of the different solutions in response to selection of the one of the plurality of modifications, wherein automatically implementing the one of the plurality of modifications comprises the processing system creating a new customization corresponding to the one of the plurality of modifications in the development database and migrating the new customization from the development database to the data storage.

13. The system of claim 12, wherein the new customization comprises at least one of a new custom object, a new custom field, and a new custom workflow.

14. The system of claim 1, wherein each of the plurality of modifications do not conflict with the existing customizations.

15. A method of supporting a new functionality at a platform, the method comprising:
receiving user input indicative of the new functionality to be supported by the platform from a client device coupled to a network;
determining a plurality of different solutions for implementing the new functionality at the platform based at least in part on existing customizations supported by the platform, each solution of the plurality of different solutions comprising a respective modification of a plurality of modifications, wherein determining the plurality of modifications comprises inputting the existing customizations and the new functionality to a model configurable to probabilistically determine the plurality of modifications for achieving the new functionality as a function of the existing customizations and the new functionality;
providing a graphical user interface display at the client device including graphical indicia of the plurality of different solutions for implementing the new functionality at the platform; and
in response to receiving indication of a selected solution of the plurality of different solutions from the client device, automatically instantiating a new customization corresponding to the selected solution at the platform, wherein the new customization comprises the respective modification of the plurality of modifications corresponding to the selected solution of the plurality of different solutions.

16. A non-transitory machine-readable storage medium that provides instructions that, when executed by a processor, are configurable to cause said processor to perform the method of claim 15.

17. The method of claim 15, wherein receiving the user input indicative of the new functionality comprises:
receiving a conversational user input comprising an unconstrained string or combination of words provided in a free-form or unstructured manner using natural language; and
analyzing the conversational user input using speech recognition or artificial intelligence to identify the new functionality to be added.

* * * * *